Patented Jan. 10, 1939

2,143,367

UNITED STATES PATENT OFFICE 2,143,367

OXYGEN YIELDING COMPOSITIONS

Philipp Balz and Albert Hloch, Bitterfeld, Germany, assignors to I. G. Farbenindustrie Aktiengesellschaft, Frankfort-on-the-Main, Germany No Drawing. Application June 24, 1936, Serial No. 87,014. In Germany June 27, 1935

6 Claims. (Cl. 23—6)

The present invention relates to improvements in oxygen yielding compositions with a view of producing oxygen and oxygen-containing gaseous mixtures which are free from carbon monoxide and therefore suitable for respiratory purposes.

In generating oxygen in known manner by the decomposition of compositions comprising substances such as chlorates and perchlorates, which, after initial heating, liberate oxygen by an automatically progressive reaction, it has hitherto been impossible, despite extensive efforts, effectively to suppress the simultaneous formation of carbon monoxide, the presence of which even in fractions of one percent of the gas mixture renders the use of the oxygen obtained for respiratory purposes impossible. Although it seemed reasonable to assume that under the conditions of reaction, viz. with a large excess of oxygen present, any carbon monoxide formed would be directly converted into the harmless carbon dioxide, this is in fact not the case. In the endeavour to suppress all formation of carbon monoxide, it was at first attempted to eliminate from the various ingredients constituting the oxygen-generating mass any components (such as carbon, which was used as an oxidizable body) which might liberate, or give rise to, the formation of carbon monoxide, but this measure has met with only partial success. The general construction of devices for yielding oxygen according to this method is described in co-applicant Hloch's copending application bearing Serial No. 78,612 and entitled "Apparatus for generating oxygen", which application was filed on May 8, 1936.

It has been found that the appearance of carbon monoxide in the reaction of oxygen-generating masses of the foregoing kind, which generally contain, in addition, also an oxidizable body, such as iron or an iron compound in admixture, the whole mass being preferably formed into a shaped body is due in part to the carbon content of the iron or iron compounds used in these masses as an oxidizable body instead of carbon, even though this carbon content is exceedingly small, and that the carbon monoxide evolved, is not completely burnt to carbon dioxide, even when the gas obtained has an oxygen content of nearly 100% and even at reaction temperatures of 600–800° C., but that a certain proportion of it always escapes as carbon monoxide along with the generated oxygen. Thus for example when an iron powder containing 0.3% of carbon was used, it was found that the gas mixture obtained still contained up to 0.05% of carbon monoxide.

The most obvious method of suppressing the formation of carbon monoxide, namely that of increasing the purity of the originating materials used for the oxygen-generating mass until they are completely free from carbon, was found to be impracticable, as the resulting expenditure was out of all proportion to the effect achieved.

The present invention is not based on the use of carbon-free originating materials, but on the idea of converting the carbon monoxide content of the gases evolved, into harmless carbon dioxide, before making use of the oxygen.

To this end, according to the invention the gases rich in oxygen developed from oxygen-generating masses of the kind hereinbefore set forth are caused to pass immediately after their formation and while still warm, over catalysts of a type known per se (and in particular metallic oxides, such as manganese oxides, if desired in admixture with copper oxide) thereby causing catalytic oxidation of the entire carbon monoxide content of the gases into carbon dioxide, which latter product can, if desired, be removed from the gas mixture in known manner. Under the conditions of the reaction, in which the catalyst is directly heated by the heat liberated in the generation of the oxygen and transmitted by said oxygen, this oxidation is complete.

In carrying the invention into practical effect, it is preferable to surround the oxygen-generating mass of for example chlorate or perchlorate base, and preferably pressed into a shaped body, with materials, such as slag wool, glass wool, pumice powder and the like, which are impregnated with the catalytic metallic oxides. The covering layer surrounding the shaped body is preferably also partly or completely impregnated with alkaline and if desired also with water-binding chemicals, so that the carbon dioxide already present in the gases or formed by the catalytic combustion is bound in situ. Suitable substances of this kind are for example the oxides or hydroxides of the alkali and alkaline earth metals. If desired it is also possible to use for this purpose the peroxides of the alkali and alkaline earth metals which afford the advantage that in absorbing carbon dioxide they generate the equivalent weight of oxygen.

We claim:

1. A moulded body for the generation of oxygen comprising a compound adapted to split off oxygen on being heated, a substantially carbon-free oxidizable body, and a filler, and an envelope surrounding said moulded body, said envelope being permeable to gas and being impregnated with a catalyst adapted to convert carbon monoxide into carbon dioxide.

2. A moulded body for the generation of oxygen comprising a compound adapted to split off oxygen on being heated, a substantially carbon-free oxidizable body, and a filler, and an envelope surrounding said moulded body, said envelope being permeable to gas and being impregnated with a catalyst comprising at least one metal oxide adapted to convert carbon monoxide into carbon dioxide.

3. A moulded body for the generation of oxygen comprising a compound adapted to split off oxygen on being heated, a substantially carbon-free oxidizable body, and a filler, and an envelope surrounding said moulded body, said envelope being permeable to gas and being impregnated with a catalyst comprising manganese oxide so as to convert carbon monoxide into carbon dioxide.

4. A moulded body for the generation of oxygen comprising a compound adapted to split off oxygen on being heated, a substantially carbon-free oxidizable body, and a filler, and an envelope surrounding said moulded body, said envelope being permeable to gas and being impregnated with a catalyst comprising manganese oxide and copper oxide so as to convert carbon monoxide into carbon dioxide.

5. A moulded body for the generation of oxygen comprising a compound adapted to split off oxygen on being heated, a substantially carbon-free oxidizable body, and a filler, and an envelope surrounding said moulded body, said envelope being permeable to gas and being impregnated with a catalyst adapted to convert carbon monoxide into carbon dioxide, and further with a substance capable of absorbing carbon dioxide.

6. A moulded body for the generation of oxygen comprising a compound adapted to split off oxygen on being heated, a substantially carbon-free oxidizable body, and a filler, and an envelope surrounding said moulded body, said envelope being permeable to gas and being impregnated with a catalyst comprising manganese oxide so as to convert carbon monoxide into carbon dioxide, and further with a compound of the group consisting of the peroxides of the alkali and alkaline earth metals.

PHILIPP BALZ.
ALBERT HLOCH.